United States Patent [19]

Matias

[11] Patent Number: 5,288,158
[45] Date of Patent: Feb. 22, 1994

[54] ONE HANDED-KEYBOARD

[76] Inventor: Edgar Matias, 178 Thistledown Blvd., Rexdale, Ontario, Canada, M9V 1K1

[21] Appl. No.: 836,289
[22] PCT Filed: Aug. 29, 1990
[86] PCT No.: PCT/CA90/00274
  § 371 Date: Feb. 25, 1992
  § 102(e) Date: Feb. 25, 1992
[87] PCT Pub. No.: WO91/03782
  PCT Pub. Date: Mar. 21, 1991

[30] Foreign Application Priority Data

Aug. 29, 1989 [CA] Canada .................. 609678

[51] Int. Cl.⁵ .................................. B41J 5/08
[52] U.S. Cl. ........................ 400/472; 400/88; 400/91; 400/100; 400/486; 235/145 R; 345/169; 345/172
[58] Field of Search .......... 400/87, 88, 91-94, 400/100, 472, 483, 486-489; 434/227, 231; 178/17 C, 79, 80, 81; 340/711; 235/145 R

[56] References Cited

U.S. PATENT DOCUMENTS

| | | | |
|---|---|---|---|
| 3,833,765 | 9/1974 | Hilborn et al. | 178/79 |
| 4,042,777 | 8/1977 | Bequaert et al. | 179/79 |
| 4,180,337 | 12/1979 | Otey, III et al. | 400/483 |
| 4,360,892 | 11/1982 | Endfield | 364/900 |
| 4,381,502 | 4/1983 | Prame | 340/365 |
| 4,555,193 | 11/1985 | Stnoe | 400/486 |
| 4,922,565 | 3/1990 | Ryan | 400/100 |
| 5,006,001 | 4/1991 | Vulcano | 400/486 |
| 5,186,555 | 2/1993 | Chiba | 400/485 |

FOREIGN PATENT DOCUMENTS

| | | | |
|---|---|---|---|
| 0102785 | 6/1983 | Japan | 400/472 |
| 0615545 | 1/1949 | United Kingdom | 400/100 |
| 2071578 | 2/1981 | United Kingdom | |

Primary Examiner—Edgar S. Burr
Assistant Examiner—Christopher A. Bennett
Attorney, Agent, or Firm—Bell, Seltzer, Park & Gibson

[57] ABSTRACT

A one-handed keyboard comprising a plurality of keys representing one half of a standard keyboard, apparatus for assigning a pair of characters to each key of the plurality of keys, one of the characters being normally associated with the key in a standard keyboard and the other character being associated with a symmetrically opposite key of the other half of the standard keyboard. A modifier key is provided for controlling the aforementioned apparatus to switch between the one half and the other half of the keyboard, whereby one-handed operation of the keyboard is provided using standard touch-typing techniques for standard keyboard design.

9 Claims, 4 Drawing Sheets

ONE HANDED-KEYBOARD

TECHNICAL FIELD

This invention relates to keyboards, and more particularly to a keyboard adapted for one-handed operation.

BACKGROUND OF THE INVENTION

The most popular English language keyboard in use today is the QWERTY design developed in 1872 by C. L. Sholes, which has become a worldwide standard. A typist rests his or her fingers on the home-rows keys (i.e. the fingers of the left on the letters A S D F, and the fingers of the right hand on J K L). The left hand governs operation of the left half of the keyboard while the right hand governs operation of the right half. All of the other keys are struck according to their position relative to the home-row keys.

For example, the keys for 3 and E are above the D key, while the C key is below. Therefore, these four keys may all be struck by the same finger of the left hand (i.e. the finger that usually rests on the D key).

A "shift" key is also normally provided for remapping the keyboard to attain capitals on the letter keys and various symbols on the non-letter keys.

A disadvantage of traditional two-handed QWERTY design is that the keyboard is quite large, and the keys are angularly offset.

Many prior art attempts have been made at developing a one-handed keyboard, for overcoming the disadvantages of traditional QWERTY layouts. For example, U.S. Pat. No. 4,555,193 (Stone) discloses the principle of assigning two or more letters/characters to each key of the keyboard and incorporating a modifier key to switch between the letters/characters in a one-handed layout. According to the Stone Patent, the modifier key for selecting a particular letter is the key having the same background color as the letter to be selected.

U.S. Pat. No. 4,180,337 (Otey) discloses an arrangement of keys on a keyboard in which each letter of the alphabet is represented by an individual key, with the keys being arranged in five primary rows.

U.S. Pat. No. 3,833,765 (Hilborn et al) teaches a one-handed keyboard and novel logic circuitry associated therewith for permitting data characters to be rapidly entered via a plurality of sequential key depressions which uniquely define each character. As in the aforementioned Otey Patent, the invention of Hilborn et al includes an alphabetical arrangement of letters.

U.S. Pat. No. 4,360,892 (Endfield) teaches a one-handed portable word processor in which the key arrangements are configured in the shape of letters such that the device uses only six keys which are actuated to create the shapes of letters or characters for composing a document.

U.S. Pat. No. 4,042,777 (Bequaert et al) teaches a one-handed keyboard with a predetermined spatial arrangement between the keys for providing combinations to complete a set of alphanumeric characters. To obtain any of the large number of combinations of characters, the user depresses more than one key at a time. The thumb may depress any of four keys or any two adjacent keys while a finger concurrently presses one key, two keys next to each other or positioned at the intersection of four adjacent keys to press all four at once.

U.S. Pat. No. 4,381,501 (Prame) also teaches a one-handed keyboard using a sequence recording circuit to obtain an increased number of combinations. For instance, if key B is pressed after key A, a different character will be produced then if key A is pressed after key B.

All of the above discussed prior art patents disclose the concept of a one-handed keyboard adapted to activate a large number of alphanumeric characters by a limited number of keys. However, none of the patents disclose or suggest incorporating a standard or traditional keyboard layout such as QWERTY or DVORAK. In fact, the above noted patents teach away from such an incorporation of traditional keyboard layout.

DISCLOSURE OF THE INVENTION

According to the present invention, an alphanumeric keyboard is provided making possible one-handed touch-typing, while at the same time capitalizing on the wide spread acceptance of and proficiency already attained in the operation of traditional keyboard layouts.

In general, according to the present invention, there is provided a one-handed keyboard, comprising:

a) a plurality of keys representing one half of a standard keyboard;

b) means for assigning a pair of characters to each key of said plurality of keys, one of said characters being normally associated with said key and the other said character being associated with the other half of said keyboard;

c) a modifier key for controlling said means for assigning to switch between said one half and said other half of said keyboard, thereby providing one-handed operation of said keyboard using standard touch-typing techniques.

BRIEF DESCRIPTION OF THE DRAWINGS

FIG. 3 illustrates the right hand field of the keyboard shown in FIG. 2;

FIG. 4 illustrates the left hand field of the keyboard shown in FIG. 2;

FIG. 5 illustrates a one-handed left hand QWERTY keyboard in accordance with a first alternative embodiment;

FIG. 6 illustrates a one-handed left hand DVORAK keyboard in accordance with a second alternative embodiment.

BEST MODE FOR CARRYING OUT THE INVENTION

Figure 1:
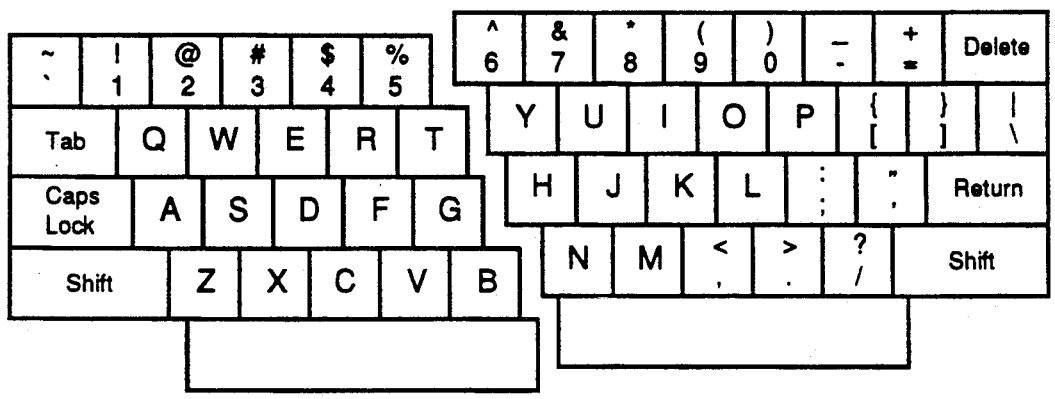
FIG. 1 illustrates a standard QWERTY keyboard split roughly in half at the point where left and right hand keys meet.

Turning to FIG. 1, a standard QWERTY keyboard is shown split roughly in half at the point where the left and right hand keys meet. As discussed above, a typist rests his or her fingers of the left hand on A S D F and the right hand on J K L. Thus, each left hand finger strikes keys on the left hand side of the keyboard which are symmetrically opposite to the keys struck by the corresponding finger of the right hand on the right side of the keyboard. For example, the D key and the K key are meant to be struck by the middle fingers of the left hand and right hand, respectively.

According to the present invention, it was realized that by assigning two letters or characters to each key, and utilizing a modifier key to switch between each such letter or character, a one-handed half-keyboard could be provided in which letters of the missing half of the keyboard are arranged to correspond exactly to their original hand pattern except on the other hand. By maintaining the traditional arrangement or layout of keys of an entire QWERTY keyboard superimposed onto one half, it is believed that a typist will require very little time to gain proficiency on a such a one-handed keyboard, as compared to the above discussed prior art designs.

Figure 2:
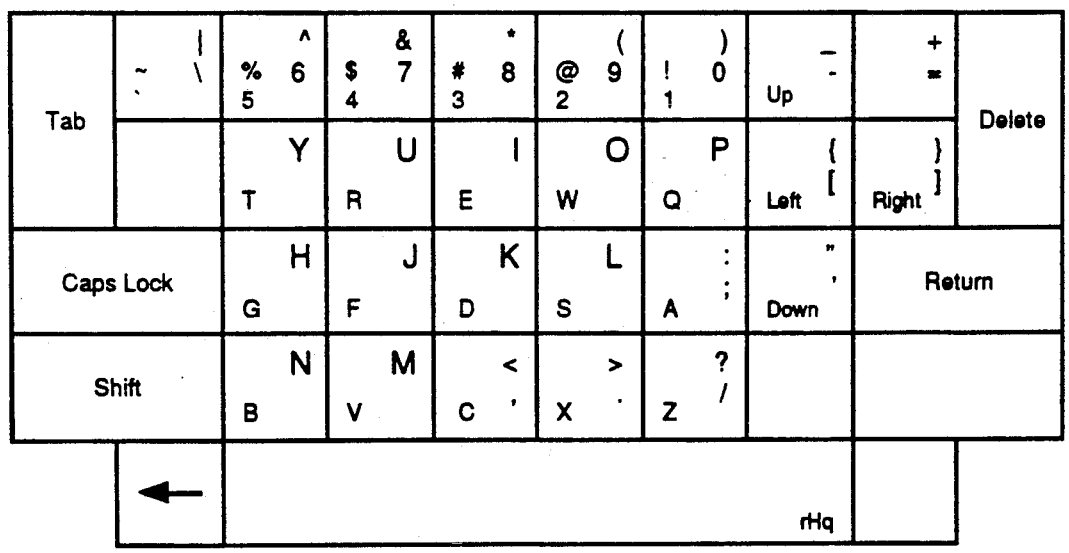
FIG. 2 illustrates a one-handed QWERTY keyboard in accordance with a preferred embodiment of the present invention.

With reference to FIG. 2, a preferred embodiment of the one-handed keyboard of the present invention is shown. The keyboard is modelled on standard QWERTY layout, and adapted for typists who wish to type with their right hand. All letters struck by the same finger of either hand occupy their respective positions relative to the corresponding key in a full sized QWERTY keyboard (e.g. the D key on the left and the K on the right are struck by the same finger).

In operation, by disengaging the←-key, (on which a typist's thumb is intended to rest), the keyboard acts exactly like the right half of a standard keyboard, as illustrated with reference to FIG. 3.

Figures 3, 4:
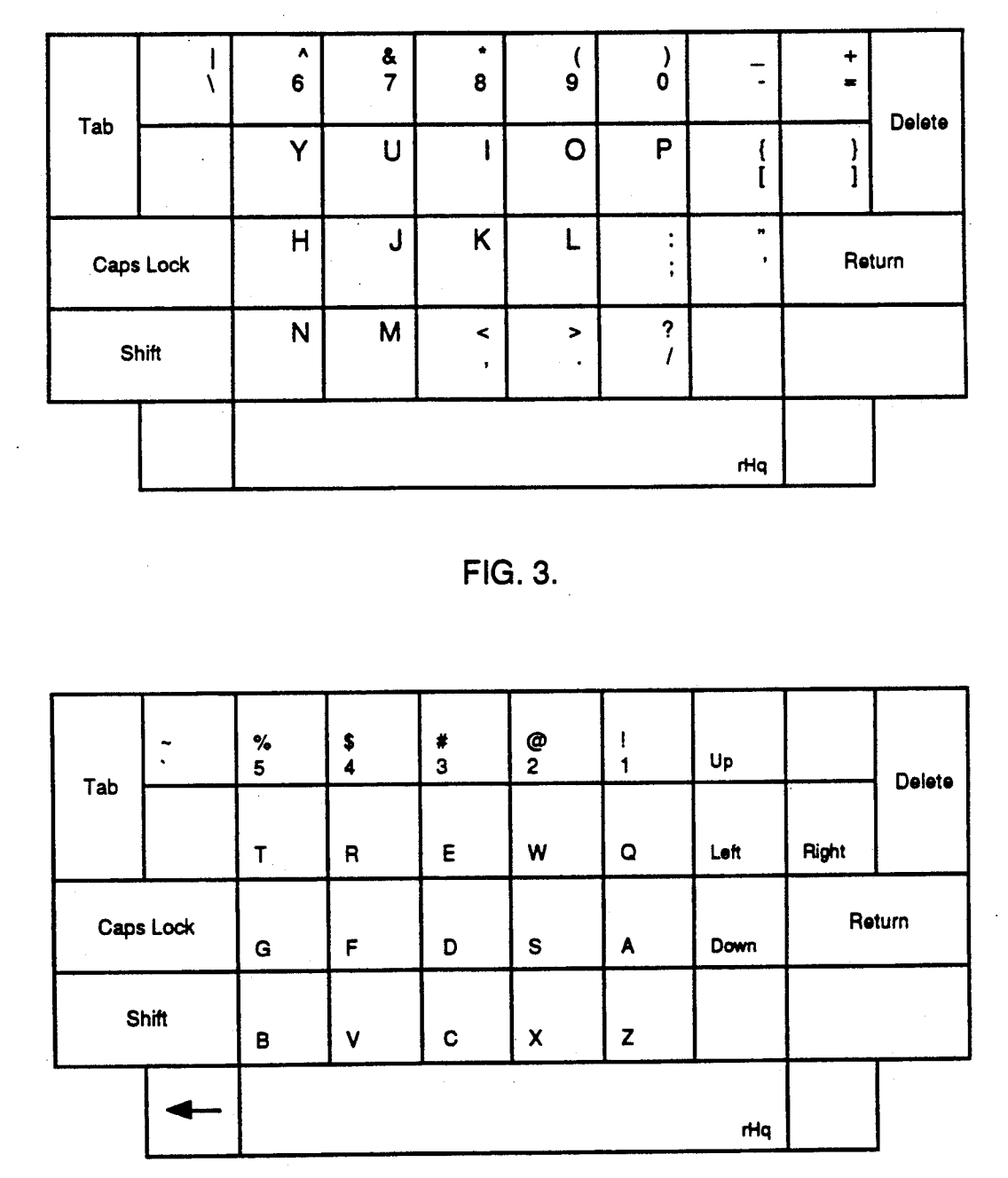

However, upon engaging the←-key, the keyboard remaps to the pattern shown in FIG. 4 corresponding exactly to the pattern of keys on the left side of a QWERTY keyboard relative to the fingers of the left hand.

For example, typing the name "Edgar Matias" would require the following keystrokes:

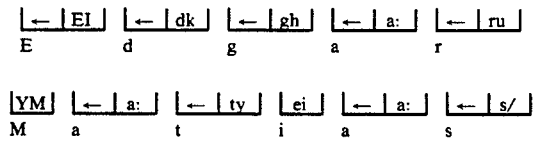

The preferred embodiment of FIG. 2 is only one of many possible design layouts in accordance with the present invention. These range from layouts to accommodate left-handed typists, layouts for DVORAK typists, as well as layouts for foreign language alphabets.

Figures 5, 6:
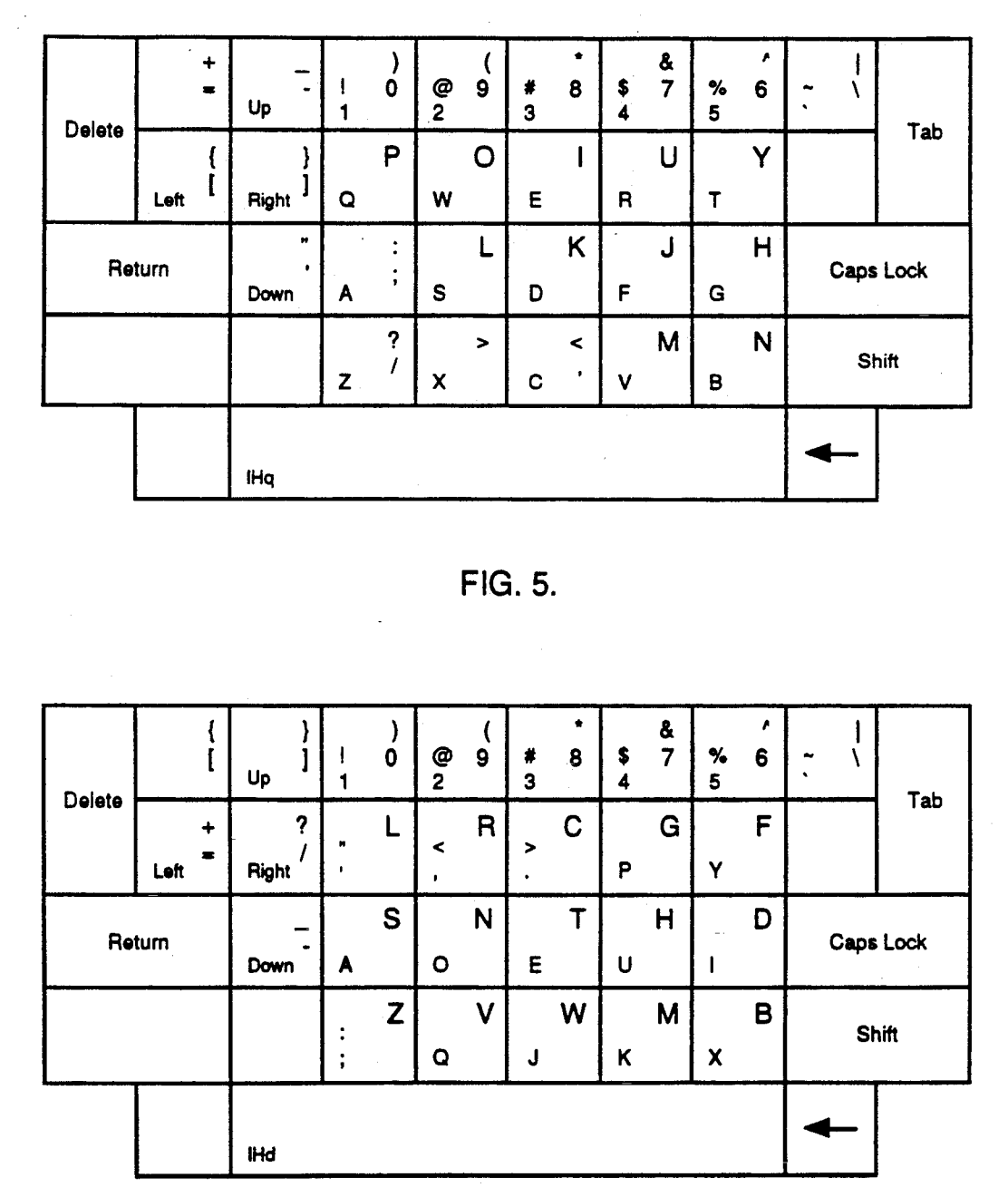
Figure 7:
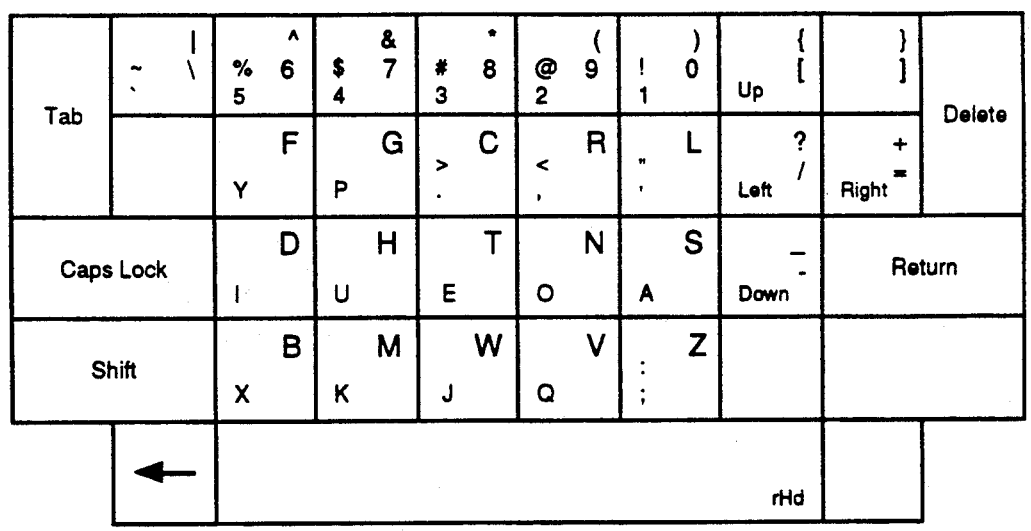
FIG. 7 illustrates a one-handed right hand DVORAK keyboard in accordance with a third alternative embodiment.

In the embodiments shown with reference to FIGS. 5-7, the←-key functions as the modifier key for switching between left and right hand fields of the keyboard layout.

Thus, FIG. 5 illustrates a left-hand QWERTY keyboard while FIG. 6 represents a left-hand DVORAK. Likewise, FIG. 7 illustrates the layout for a right-handed DVORAK keyboard.

Industrial Applicability

The one-handed keyboard of the present invention may be manufactured according to known industrial techniques, and performs the utilitarian function of enabling input of alpha-numeric information using only one hand.

In summary, the one-handed keyboard of the present invention benefits from numerous advantages over standard two-handed full-QWERTY layout design. For instance, the keyboard is more compact, being over one third smaller than a full-sized two-handed keyboard. This allows for the design of smaller computers and word processors without sacrificing the ability to touch-type. The design of the present invention requires only one hand for operation. Thus, the other hand of the typist is left free for hand writing, control of a mouse/joystick, etc. Physically handicapped persons who may only have the use of one hand, are able to touch-type with the keyboard of the present invention.

Furthermore, the one-handed keyboard of the present invention can actually generate more characters than a standard full-sized keyboard. In particular, the one-handed keyboard of the present invention generates at least two characters for every key on the keyboard, and twice the number of keys on the present one-handed keyboard exceeds twice the number of keys on one half of the prior art two handed keyboard (see FIGS. 1 and 2).

Moreover, the one-handed keyboard of the present invention is horizontally symmetrical. Therefore, there need not be any physical difference between a left and a right hand keyboard, thus allowing concurrent production of left and right hand keyboards without the increase in production costs that is characteristic of prior art two-handed keyboards having angularly offset keys. This also allows for remapping of the keyboard to form a numeric keypad (e.g. telephone key pad). In other words, the problem of prior art two-handed keyboards is not present with the one-handed keyboard of the present invention, since the typist,s arm does not protrude at an angle. Instead, the typist,s arm extends perpendicularly of the keyboard. Therefore, the keys need not be slanted. They may be arranged in a more comfortable and more convenient orthogonal grid pattern.

One major strength of the one-handed keyboard of the present invention is that it does not abandon the traditions of the past, but rather uses them to its advantage. Thus, it is possible with the keyboard of this invention to touch-type with only one hand. This, combined with the advantage of compact size, enables makers of pocket computers to adopt the present design of keyboard for application to word processing markets. Also, as discussed above, a touch-typist can begin typing almost immediately on the one-handed keyboard of the present invention since learning time is reduced to a minimum.

Other embodiments or variations are possible within the sphere and scope of the present invention. For example, the illustrations discussed above deal largely with computer keyboards and software control of keyboard layout and remapping. This, however, need not necessarily be the case. Mechanical, electric and other means of control and remapping can be designed to accommodate the principles of the present invention.

Non-letter symbols on the keyboards of the present invention need not be in the positions (or shapes) shown in FIGS. 2-7. There is often variation among full-sized traditional keyboard layout designs as to the positions of non-letter symbols. Similar variations can be made to the one-handed keyboard of the present design, without departing from the principles set forth.

Furthermore, it is possible to add more modifier keys for obtaining even more characters. These modifier keys could be placed in any location (and in whatever shape) that is convenient.

The keys on the one-handed keyboard of the present invention as shown with reference to FIGS. 2-7 are arranged in orthogonal grid pattern. For one-handed typing, this layout is thought to be most convenient and most comfortable. However, the keys need not arranged as such. A one-handed keyboard could be arranged with keys disposed at an angle, as with traditional full-sized keyboards.

The various embodiments of one-handed keyboard illustrated in FIGS. 2-7 may be electronically implemented by any appropriate means known to those skilled in the art.

All such modifications and variations are believed to be within the sphere and scope of the present invention as defined by the claims appended hereto.

I claim:

1. A one-handed typing keyboard adapted to replace a standard two-handed typing keyboard having one half including keys with a predetermined sequence of characters thereon and normally operated by one hand and another half including keys with a predetermined sequence of different characters thereon and normally operated by the other hand of a typist, said one-handed typing keyboard comprising:
   a) a plurality of keys representing one half the number of keys in the standard keyboard;
   b) means for assigning a pair of different characters to each key of said plurality of keys, one of said characters being normally associated with the sequence of characters on the one half of the standard two-handed keyboard and the other of said characters being associated with the sequence of characters on the other half of the standard two-handed keyboard;
   c) means for controlling said means for assigning a pair of characters to each key and for switching between the sequences of different characters on said one-handed keyboard thereby providing one-handed operation of said keyboard which can use touch-typing techniques normally used with the standard two-handed keyboard.

2. A one-handed typing keyboard, as defined in claim 1, wherein the standard two-handed typing keyboard is a QWERTY having the one half of the keyboard separated between the other half of the keyboard by the keys having the standard characters:

5 and 6; T and Y; G and H; and B and N.

3. A one-handed typing keyboard, as defined in claim 1, wherein the standard two-handed typing keyboard is a DVORAK having the one half of the keyboard separated between the other half of the keyboard by the keys having the standard characters:

5 and 6; Y and F; I and D; and X and B.

4. A one-handed typing keyboard, as defined in claim 1, 2 or 3, wherein said plurality of keys comprises an orthogonal grid arrangement.

5. A one-handed typing keyboard, as defined in claim 2, in which said pair of different characters on each key of said plurality of keys is arranged in a right-handed QWERTY configuration wherein said one of said characters on each of said keys is arranged consistent with the sequence of characters on the right-hand half of the standard two-handed QWERTY keyboard and the other of said characters is arranged in a mirror image of the sequence of characters on the left-hand half of the standard two-handed QWERTY keyboard.

6. A one-handed typing keyboard, as defined in claim 2, in which said pair of different characters on each key of said plurality of keys is arranged in a left-handed QWERTY configuration wherein said one of said characters on each of said keys is arranged consistent with the sequence of characters on the left-hand half of the standard two-handed QWERTY keyboard and the other of said characters is arranged in a mirror image of the sequence of characters on the right-hand half of the standard two-handed QWERTY keyboard.

7. A one-handed typing keyboard, as set forth in claim 3, in which said pair of different characters on each key of said plurality of keys is arranged in a right-handed DVORAK configuration wherein said one of said characters on each of said keys is arranged consistent with the sequence of characters on the right-hand half of the standard two-handed DVORK keyboard and the other of said characters is arranged in a mirror image of the sequence of characters on the left-hand half of the standard two-handed DVORAK keyboard.

8. A one-handed typing keyboard, as defined in claim 3, in which said pair of different characters on each key of said plurality of keys is arranged in a left-handed DVORAK configuration wherein said one of said characters on each of said keys is arranged consistent with the sequence of characters on the left-hand half of the standard two-handed DVORK keyboard and the other of said characters is arranged in a mirror image of the sequence of characters on the right-hand half of the standard two-handed DVORAK keyboard.

9. A one-handed typing keyboard, as defined in claim 1, wherein said means for controlling said means for assigning comprises a modifier key.

* * * * *

UNITED STATES PATENT AND TRADEMARK OFFICE
CERTIFICATE OF CORRECTION

PATENT NO. : 5,288,158
DATED : February 22, 1994
INVENTOR(S) : Edgar Matias

It is certified that error appears in the above-identified patent and that said Letters Patent is hereby corrected as shown below:

On the cover page, References Cited: Item [56]

"Stnoe" should be -- Stone --.

Patent No. "4,922,565" should be -- 4,911,565 --.

Patent No. "0615545" should be -- 0615542 --.

Signed and Sealed this

Fourteenth Day of June, 1994

Attest:

BRUCE LEHMAN

Attesting Officer    Commissioner of Patents and Trademarks